V. V. TORBENSEN.
MOTOR VEHICLE DRIVING MECHANISM.
APPLICATION FILED MAY 17, 1918.

1,397,495.

Patented Nov. 15, 1921.

INVENTOR
Viggo V. Torbensen
BY
J. Mortimer Ward Jr.
his ATTORNEY

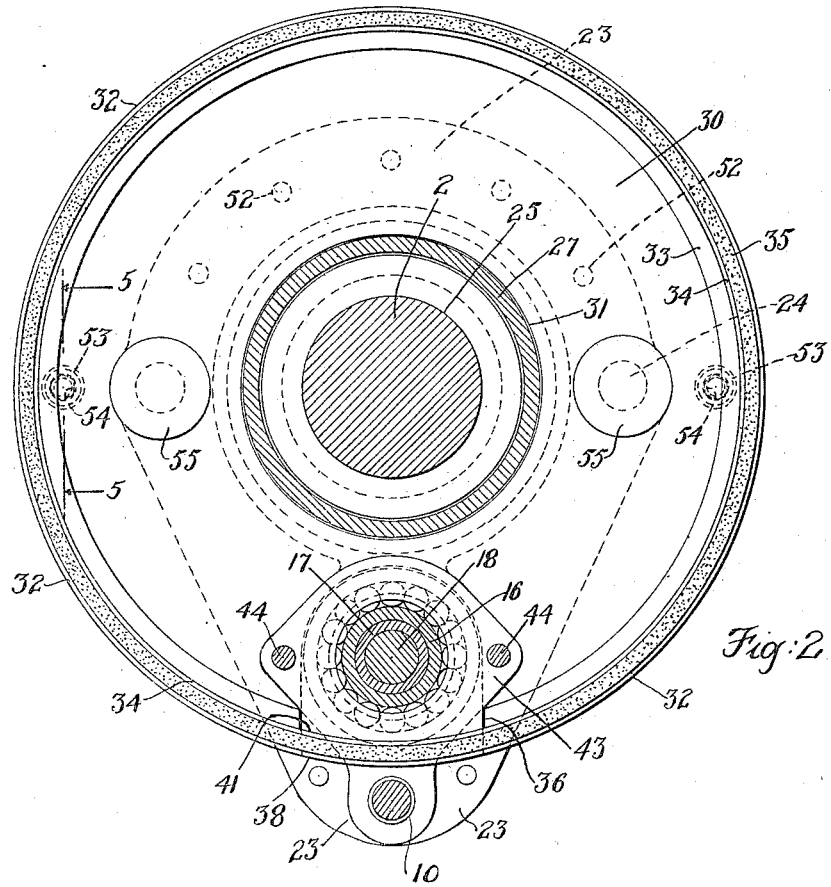
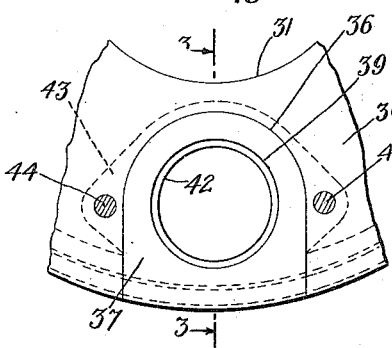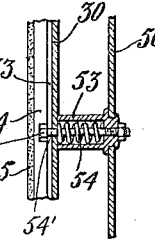
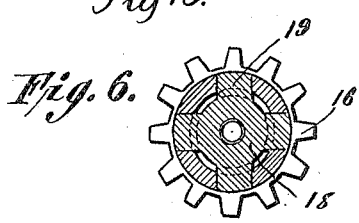

UNITED STATES PATENT OFFICE.

VIGGO V. TORBENSEN, OF CLEVELAND, OHIO, ASSIGNOR TO THE TORBENSEN AXLE COMPANY, OF CLEVELAND, OHIO, A CORPORATION OF OHIO.

MOTOR-VEHICLE DRIVING MECHANISM.

1,397,495.	Specification of Letters Patent.	Patented Nov. 15, 1921.

Application filed May 17, 1918. Serial No. 235,085.

*To all whom it may concern:*

Be it known that I, VIGGO V. TORBENSEN, a citizen of the United States, and a resident of Cleveland, in the county of Cuyahoga and State of Ohio, have invented certain new and useful Improvements in Motor-Vehicle Driving Mechanism, of which the following is a specification.

The invention relates to improvements in motor vehicle driving mechanism, and more particularly to mechanism for inclosing and protecting the internal driving gear for driving the traction wheels of the vehicle.

One object of the invention is to provide a simple and efficient arrangement for protecting the internal driving gear from dust and dirt. A further object is to provide an arrangement in which grease from the internal driving gear is substantially prevented from reaching the brake drum on the outside thereof. A further object is to provide an arrangement which is not only simple and efficient but which is so constructed that the parts are easily assembled and disassembled.

In the preferred embodiment of my invention herein illustrated, the protective casing comprises a plate structure supported from the axle and yieldably pressed toward a part of the wheel structure also forming a part of the casing, and a packing interposed between the two, so that there is provided a yieldably maintained running joint between the said plate and wheel structure to exclude dirt and retain lubricant.

Heretofore running joints have been provided between the rotatable and stationary parts of gear housings for protecting the gears at the wheels, but these running joints have consisted in either allowing the adjacent portions of the housings to extend into close proximity to each other, omitting packing or putting packing in a groove in one of the members, and it has also been proposed to use between the relatively rotatable housing members a strip of leather, but these various provisions have been found to be more or less unsatisfactory in maintaining a good tight running joint such as will exclude dirt from the housing and retain lubricant within the housing, due to wear and deterioration of the packing or leather. Packing material such as felt, for example, has but a relatively small amount of inherent expansibility, and when it becomes soaked in oil or grease and packed down and condensed by the oil and dirt it tends to lose a certain amount of this property, and in addition thereto it is rapidly worn away by the constant friction and grit, so that a good running joint cannot be maintained. In case of the leather strip, it is difficult to obtain a good fit, and the leather may either "set" and wrinkle, or when soaked with lubricant soften and lose its tendency to press closely to the relative rotating part, and furthermore it is expensive to renew.

By providing the packing material preferably in the form of a felt packing ring to form the running joint between the relatively rotatable housing members, and providing suitable spring members to continually maintain the packing pressed against the member with which it has relative rotation, a good close running joint is maintained at all times and until the packing is completely worn away, regardless of any condensing of the packing or the wearing of the same so long as there is enough to maintain the contact.

My invention consists in the novel features and combinations of parts hereinafter described in their preferred embodiment, and the invention is more particularly pointed out in the appended claims.

Further objects and advantages of the invention will more fully appear from the following description taken in connection with the accompanying drawings illustrating the preferred form of the invention, and in which—

Fig. 2 is a vertical face view of the plate and parts associated therewith, covering the inner side of the internal driving gear shown in Fig. 1;

Fig. 3 is a vertical section taken on the line 3—3 of Fig. 4;

Fig. 4 is a detail face view of parts shown in Fig. 2 looking in the opposite direction;

Fig. 5 is a detail section taken on the line 5—5 of Fig. 2, and

Fig. 6 is a detail of a driving pinion.

Figure 1:
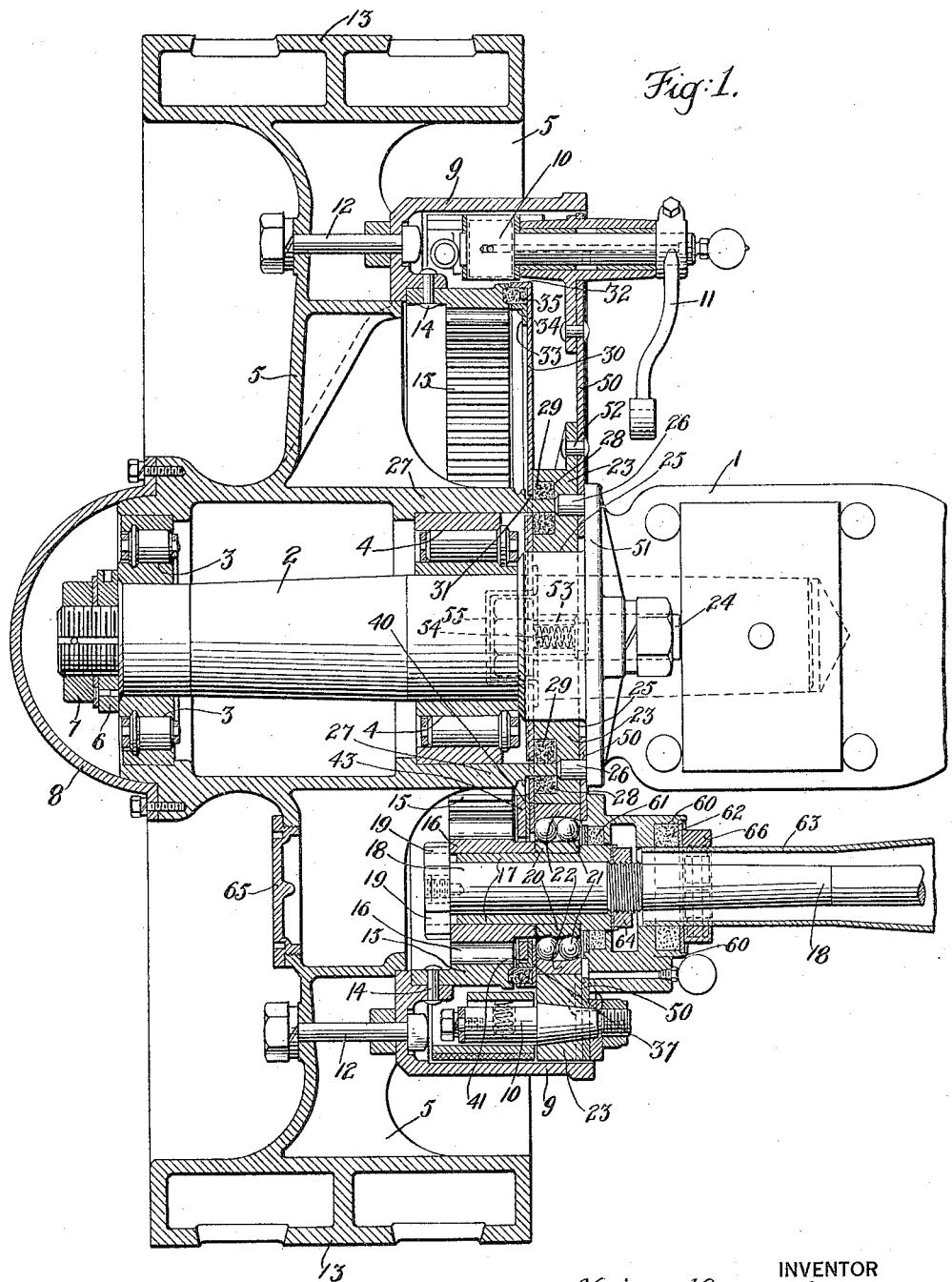
Figure 1 is a horizontal section (certain parts being shown in plan view) of a motor vehicle wheel and axle structure embodying the improvements in the preferred form.

In the drawings, 1 represents a non-rotating axle structure having its outer end reduced at 2 to accommodate the roller bearings 3 and 4 on which the wheel structure 5 rotates, the wheel structure being retained on the axle by nuts 6 and 7 and a cap 8 covering the nuts and bearings 3. Secured to and practically forming part of the wheel structure is a brake drum 9 within which is located any well-known or suitable emergency brake apparatus 10 coöperating with the drum 9 and operated by crank lever 11. The brake drum member is rigidly secured to the main part of the wheel structure by bolts 12, and the wheel structure is provided with a peripheral rim 13 to which a solid rubber or other suitable tread is adapted to be secured.

Rigidly secured to the brake drum member 9 by rivets 14 and forming a part of the wheel structure, is an internal driving gear 15 for driving the tread wheel structure and having meshing therewith a driving pinion 16 having a tight fit on a sleeve 17 surrounding a jack shaft 18. The jack shaft 18 has integral with it at its end, four radial projections 19 which fit into cut-out parts in the end of the pinion 16, as shown in Fig. 6, so that shaft 18 is locked with the pinion 16 and will drive the same. The driving shaft 18 carries a bearing sleeve 20 around which are located ball bearings 21 in a ball raceway 22 fitting snugly within a circular opening in a member 23 rigidly secured to the axle structure by bolts 24, the member 23 also having a central opening at 25 through which the main axle member extends. To more rigidly secure the member 23 with respect to the axle structure, dowel pins 26 extend from the latter into the member 23.

The wheel structure 5 is provided with a hub portion 27 extending over the bearings 4 and into a circular recess 28 in the member 23 to form a running joint therewith, the recess being filled with an oily felt packing 29 on both sides of the hub portion 27 to effectively exclude dust and dirt from the bearings 3 and 4 and to prevent oil from running out of the hub portion.

The internal gear 15 is closed to dust and dirt on one side by the wheel structure 5—9, and on the other side by a plate 30 having a central opening at 31 through which the hub portion 27 passes and provided with an upturned flange 32 at the periphery. Secured to the plate 30 is a flat ring 33 provided with a concentric upturned flange 34 of slightly less diameter than flange 32 so as to form a groove between the two flanges, which is filled with an oily felt packing 35 which extends into an opposing groove in the wheel structure, preferably in the internal gear part of the wheel structure, and forms a running lubricated joint therewith so that dust and dirt are effectively excluded from the chamber containing the internal gear 15 at this point, as well as from the hub chamber containing the bearings 3 and 4. While in the present preferred embodiment of the invention I have shown the packing as mounted on the stationary member or plate 30 and pressed toward the rotating housing portion, it will be obvious to those skilled in the art that in so far as concerns the broad aspect of the invention, it is immaterial as to which of the housing members the packing forms a running joint with. The two chambers are made independent by reason of the hub portion 27 extending into the member 23, and the plate 30 bears against and aids in retaining the packing 28 in the circular groove in the member 23 so that dust and dirt are excluded from the internal gear chamber at this point.

In order to accommodate the jack shaft 18 and the bearings therefor, the plate 30 and ring member 33 are cut away from their periphery as shown at 36 in Fig. 4, and in the plane of the plate 30 is inserted a plate 37 having a similar upturned flange 38 and a circular opening 39 through which the sleeve 16 passes. Adjacent the plate 37 is placed another plate 40 having an upturned flange 41 corresponding to the flange 34 on ring 33 so that a groove is formed between the flanges 38 and 41 which is filled with similar packing forming a lubricating running joint with the opposing groove in the internal ring gear member 15. The plate 40 also has an opening 42 through which the sleeve 16 passes. A third plate 43 is bolted to the member 23 by bolts 44 with the plates 37 and 40 between the plate 43 and member 23, so that the plates 37 and 40 are securely held in position on the member 23, the plate 40 overlapping the cutaway edge of the plate 30 so as to hold the latter in place against the member 23.

A plate 50 is rigidly secured between the member 23 and shoulder 51 on the axle, the plate 50 being riveted to member 23 by rivets 52, and being cut out to permit of insertion of the axle portion 2 and jack shaft 18 therethrough. This plate 50 substantially closes the third chamber occupied by the emergency brake apparatus, to dust and dirt.

Secured to the plate 50 are two thimbles 53 containing springs 54 (see Fig. 5 also) which bear against the plate 30 tending to force the periphery of the latter toward the internal gear member, so the packing carried by the plate 30 will bear against the internal gear member with a spring pressure and thus continue to maintain a good joint as the packing wears, and more positively exclude dust and dirt and prevent oil from getting into the emergency brake chamber. In order to limit the outward movement of the spring-pressed plate 30 when the wheel is removed, I provide bolts 54' threaded into the bottoms of the thimbles 53 and having heads 54'' adapted to be engaged by the plate 50 after it has been moved out a certain distance.

Felt packing cups 55 are secured over the heads of bolts 24 to prevent oil leaking out of the internal gear chamber through the bolt holes.

A jack shaft sleeve securing member 60 is held firmly up to plate 50 and member 23 by means of the bolts 44 (Figs. 2 and 4), and is provided with packings at 61 and 62 to prevent oil running out from the bearings 21. A sleeve 63 covers the greater portion of the jack shaft 18 and a spring clamping nut 66 clamped onto the sleeve 63 holds the packing 62 in place. A nut 64 screw-threaded on the jack shaft 18 maintains the sleeve 17, bearing member 20 and pinion 16 in position on the jack shaft and firmly against the teeth 19 integral with and projecting outwardly from the end of the jack shaft. A screw cap 65 closes an opening in the outside of the wheel structure opposite the jack shaft 18, and on removing this cover the jack shaft may be easily reached therethrough.

In assembling, the bearing 20 with the balls 21 and ball raceway 22 is pressed onto the sleeve 17, then the plates 37, 40 and 43 are slipped loosely over the sleeve 17 and the pinion 16 is fitted on the sleeve 17; all before the main part of the wheel structure is slipped onto the axle spindle 2. The parts so far assembled are then slipped in place in the member 23 and screw bolts 44 tightened up to force and secure in place the whole bearing by means of plate 43. The main wheel structure may then be put onto the axle spindle 2 and secured in place by nuts 6 and 7, after which the jack shaft is slipped through the opening normally closed by the screw cap plate 65, and through the sleeve 17 and so that the teeth 19 thereon fit in the cutaway portions in the end of the pinion 16 so as to drive the latter. The nut 64 is then tightened up to secure the jack shaft in place in the sleeve 17 and bearing. The jack shaft sleeve securing member 60 is then moved along the sleeve 63 and up to the member 23 and bolted thereto by means of nuts coöperating with the ends of the screw bolts 44 which pass through lateral openings in the member 60. Then the spring clamping nut 66 may be secured in place to hold the packing 62 in place.

If it is desired to remove the shaft 18 from the differential gearing which usually drives it, the clamp 66 and member 60 are loosened so as to permit of access to the nut 64 which screwed off of the threads on the shaft 18. The cap 65 is then removed and a tool screwed into the end of the shaft 18 and the latter pulled thereby toward the opening covered by cap 65. In this manner the shaft 18 may be removed sufficiently to free such differential gearing while leaving the sleeve 17 and parts carried thereby, including the pinion 16, in place in the gear chamber without getting the pinion 16 out of mesh with the gear 15.

By extending the hub portion 27 into the axle structure member 23 and providing an oily water repellent packing therebetween and providing the member 30 closing the inner face of the gear 15 and providing a similar packing between it and the gear, two independent chambers are formed, one for the wheel bearings and the other for the internal gear, which chambers are practically closed to dirt and water and the leaking out of the lubricant from the hub chamber into the gear chamber, or vice versa, is prevented. By providing still a third independent chamber for the internal brake apparatus, not only is dirt and water practically excluded therefrom, but the leaking of lubricant thereinto from either of the first two mentioned chambers is substantially prevented.

Various features herein shown and described pertaining to the removability of the jack shaft 18 are not claimed herein, but they form the subject matter of a co-pending application Serial Number 237,040, filed by me on May 28, 1918, entitled Driving mechanism for motor vehicles.

While I have described my invention in great detail with respect to the present embodiment thereof, it will be obvious to those skilled in the art, after understanding my invention, that various changes and modifications may be made therein without departing from the spirit or scope of my invention, and I therefore do not wish to be understood as limiting my invention other than as indicated in the appended claims.

Having thus described my invention, what I claim as new and desire to secure by Letters Patent, is:—

1. In a motor vehicle, the combination of an internal driving gear, a pinion driving said gear, a shaft driving said pinion, means rotating with said internal gear and closing one side thereof to dirt and water, non-rotating means closing the other side of the internal gear to dirt and water, and one or more springs for holding said means yieldably against portions carried with the internal gear to insure a tight running joint between the non-rotatable and the rotatable parts of the gear inclosing structure.

2. In a motor vehicle, the combination of a wheel, an internal driving gear therefor, a pinion driving said gear, a shaft driving said pinion, said gear and pinion being inclosed on one side by a part of the wheel structure, a plate for inclosing the other side, a packing forming a running joint between the plate and wheel structure, and means yieldingly pressing said plate toward the wheel.

3. In a motor vehicle, the combination of an internal driving gear, a pinion driving said gear, a shaft driving said pinion, means closing said gear on one side, and means closing the other side of said gear, said last mentioned means and said gear having circular opposing grooves, and a lubricating packing in said grooves forming a running joint between the two for retaining grease.

4. In a motor vehicle, the combination of a non-rotating axle, a tread wheel structure rotatable thereon having an internal driving gear rigid therewith and closed on one side by the wheel structure, a plate secured to the axle structure and closing the internal gear to dirt and water on the other side thereof, and springs acting to force the periphery of said plate toward the wheel structure.

5. In a motor vehicle, the combination of a non-rotating axle, a tread wheel structure rotatable thereon having an internal driving gear rigid therewith and closed on one side by the wheel structure, a plate secured to the axle structure and closing the internal gear to dirt and water on the other side thereof, springs acting to force the periphery of said plate toward the wheel structure, and a packing interposed between said plate and wheel structure at the point where there is a running joint therebetween.

6. In a motor vehicle, the combination of a non-rotating axle structure, a rotating wheel structure carried thereby having an internal driving gear rigid therewith and closed on one side by the wheel structure, a pinion driving said internal gear, a plate secured to the axle structure and adapted to substantially close the other side of said internal gear, a shaft extending through said plate to drive said pinion, bearings for said shaft, a bearing member for said bearings and rigid with the axle structure, said plate being cut away from its periphery to permit the insertion of said bearings therethrough into the said bearing member, a plate cut out to surround said shaft but otherwise closing the opening in said first plate, and means securing said second plate in place.

7. In a motor vehicle, the combination of a non-rotating axle structure, a rotating wheel structure carried thereby having an internal driving gear rigid therewith and closed to dirt and water on one side by the wheel structure, a pinion driving said internal gear, a plate secured to the axle structure and adapted to substantially close the other side of said internal gear to dirt and water, a shaft extending through said plate to drive said pinion, bearings for said shaft, a bearing member for said bearings and rigid with the axle structure, said plate being cut away to permit the insertion of said bearings therethrough into the said bearing member, a plate cut out to surround said shaft but otherwise closing the opening in said first plate, and means securing said plates in place, both of said plates having means forming a peripheral groove, and a packing in said groove forming a running joint with the wheel structure.

8. In a motor vehicle, the combination of a non-rotating axle structure, a rotating wheel structure carried thereby having an internal driving gear rigid therewith and closed to dirt and water on one side by the wheel structure, a pinion driving said internal gear, a plate secured to the axle structure and adapted to substantially close the other side of said internal gear to dirt and water, a shaft extending through said plate to drive said pinion, bearings for said shaft, a bearing member for said bearings and rigid with the axle structure, said plate being cut away from its periphery to permit the insertion of said bearings therethrough into the said bearing member, a plate cut out to surround said shaft but otherwise closing the opening in said first plate, and means securing both plates rigid to the bearing member, both of said plates having means forming a peripheral groove, and a packing in said groove forming a running joint with the wheel structure, said last mentioned means comprising plates with upturned peripheral flanges spaced from and within upturned peripheral flanges on the first two mentioned plates, the packing being held between the peripheral flanges.

9. In a motor vehicle, the combination of a non-rotating axle, a tread wheel structure rotatable thereon having an internal driving gear rigid therewith and closed on one side by the wheel structure, a plate secured to the axle structure and closing the internal gear to dirt and water on the other side thereof, said plate having an opening permitting insertion of the axle structure therethrough, said wheel structure having a rearwardly extending hub portion extending through said opening, and packing between said plate and hub portion forming a running joint between the two.

10. In a motor vehicle, the combination of a non-rotating axle, a tread wheel structure rotatable thereon having an internal driving gear rigid therewith and closed on one side by the wheel structure, a plate secured to the axle structure and closing the internal gear to dirt and water on the other side thereof, said plate having an opening permitting insertion of the axle structure therethrough, said wheel structure having a hub portion extending through said opening, said axle structure having an annular groove into which said hub portion projects, and a packing in said groove forming a running joint with said hub portion.

11. In a motor vehicle, the combination of a non-rotating axle, a tread wheel structure rotatable thereon, having an internal driving gear rigid therewith and closed on one side by the wheel structure, a plate secured to the axle structure and closing the internal gear to dirt and water on the other side thereof, said plate having an opening permitting insertion of the axle structure therethrough, said wheel structure having a rearwardly extending hub portion, and a packing interposed between a part of said axle structure and said hub portion to form a running joint between the two.

12. In a motor vehicle, the combination of a non-rotating axle, a tread wheel structure rotatable thereon having an internal driving gear rigid therewith and closed on one side by the wheel structure, a plate secured to the axle structure and closing the internal gear to dirt and water on the other side thereof, said plate having an opening permitting insertion of the axle structure therethrough, said wheel structure having a hub portion forming a running joint with the axle structure, a packing interposed between said axle structure and said hub portion, and a packing interposed between said plate and the wheel structure and forming a running joint therewith.

13. In a motor vehicle, the combination of a non-rotating axle structure having a spindle and an annular groove concentric therewith, with packing in said groove, a wheel structure rotatably mounted on the spindle, bearings for the wheel structure, the hub of the wheel having a closed front end and having a rear portion projecting into said groove in the axle structure and having a running joint therewith so as to inclose said bearings and prevent access of dirt and water thereto, said wheel structure having rigid therewith an internal driving gear for driving the wheel structure and situated outside of said hub portion, said gear being closed on one side by the wheel structure and means substantially closing the other side of the driving gear to dirt and water and having a running joint with the wheel structure, whereby two independent chambers are provided one for the wheel structure bearings and the other for the internal driving gear.

14. In a motor vehicle, the combination of a wheel, an internal driving gear therefor, a pinion driving said gear, a shaft driving said pinion, said gear and pinion being inclosed on one side by a part of the wheel structure, a plate for inclosing the other side, means yieldingly pressing said plate toward the wheel, and means for limiting the movement of said plate responsive to said pressure when the wheel is removed.

15. In a motor vehicle, the combination of an axle, a road wheel, a driven gear operatively connected with said wheel to rotate the same, a driving pinion geared to said gear, a shaft for driving said pinion, said gearing being inclosed on one side by the wheel structure, means on the axle structure inclosing the gearing on the other side and forming with the said wheel structure an inclosing housing for the gears, packing forming a running joint between the peripheral portions of said last means and the adjacent portion of the rotatable housing member, and one or more springs acting to force the peripheral portion of the non-rotatable housing member toward the rotatable member to automatically maintain a good running joint between said members.

16. In a motor vehicle, the combination with an axle shaft having a road wheel, a drive shaft, and gearing at the wheel for driving the wheel from the shaft, of a housing for inclosing said gearing comprising relatively rotatable housing portions, one portion rotatable with the wheel and the other portion carried by the axle, a packing located between adjacent portions of the relatively rotatable housing members and coöperating therewith to form a running joint between the same, and one or more coöperating spring members acting to automatically maintain the packing against the housing members between which and the packing there is relative rotation, so as to maintain a good running joint.

17. In a motor vehicle, the combination of a wheel, a driving ring gear operatively connected to the wheel to drive the same, a pinion geared to the said ring gear to drive the same, and a shaft for said pinion, an axle, a housing inclosing said gear and pinion comprising relatively rotatable housing portions, one portion rotatable with the wheel and the other relatively stationary and carried by the axle, a packing located between adjacent parts of the relatively rotatable housing members and coöperating with said parts to form a running joint therebetween, an annular member on one of said housing members providing therewith a receiver for the packing, and one or more springs acting to force said receiver and packing toward the other housing member to automatically maintain a good running joint between said housing members.

18. In a motor vehicle, the combination of a wheel, a driving ring gear operatively connected to the wheel to drive the same, an axle, a pinion geared to the said driving gear to drive the same, and a shaft for said pinion, said gears being inclosed on one side by a part of the wheel structure, and a non-rotatable structure carried by the axle inclosing the other side, the inclosing part of the wheel structure extending inwardly toward the non-rotatable inclosing structure, a packing between said inwardly extending rotatable part and the adjacent peripheral portion of the non-rotatable inclosing structure, and one or more springs acting upon said peripheral portion to force the same toward said rotatable part to automatically maintain a good running joint therebetween.

19. A motor vehicle driving axle structure of the type having in combination, a load axle, a wheel, a driving gear secured to and rotatable with the wheel, a pinion driving same and an inclosing housing for the gears comprising relatively rotatable parts one rotatable with the wheel and a non-rotatable part carried by the axle, characterized by a packing between the adjacent portions of the relatively rotatable housing parts with coöperating springs acting to press the packing into engagement with the housing part between which and the packing there is relative rotation, to maintain a good running joint between the relative rotatable housing parts.

In testimony whereof, I have signed my name to this specification.

VIGGO V. TORBENSEN.

Corrections in Letters Patent No. 1,397,495.

It is hereby certified that in Letters Patent No. 1,397,495, granted November 15, 1921, upon the application of Viggo V. Torbensen, of Cleveland, Ohio, for an improvement in "Motor-Vehicle Driving Mechanism," errors appear in the printed specification requiring correction as follows: Page 5, claim 16, line 88, strike out the word "shaft," and line 101, for the word "members," read *member;* and that the said Letters Patent should be read with these corrections therein that the same may conform to the record of the case in the Patent Office.

Signed and sealed this 3d day of January, A. D., 1922.

[SEAL.]

WM. A. KINNAN,
*Acting Commissioner of Patents.*